United States Patent [19]

Coots

[11] 4,258,665
[45] Mar. 31, 1981

[54] ADJUSTABLE FOAL FEEDER

[76] Inventor: Warren R. Coots, 2363 Hialeah Cir., Norco, Calif. 91760

[21] Appl. No.: 38,669

[22] Filed: May 14, 1979

[51] Int. Cl.³ .............................................. A01K 5/00
[52] U.S. Cl. .................................................... 119/61
[58] Field of Search ............................. 119/61, 63, 59

[56] References Cited

U.S. PATENT DOCUMENTS

| | | | |
|---|---|---|---|
| 765,242 | 7/1904 | Johnson | 119/63 |
| 1,257,861 | 2/1918 | Herbert | 119/61 |
| 1,283,627 | 11/1918 | Barnes | 119/61 |
| 1,602,000 | 10/1926 | Custer | 119/63 |
| 1,672,043 | 6/1928 | Seikman | 119/61 |
| 2,675,782 | 4/1954 | Lage | 119/61 |
| 2,827,876 | 3/1958 | Trobaugh | 119/59 |

FOREIGN PATENT DOCUMENTS 123485  2/1919  United Kingdom ...................... 119/61

Primary Examiner—Jay N. Eskovitz
Attorney, Agent, or Firm—G. Donald Weber, Jr.

[57] ABSTRACT

There is described a feeder which is adjustable in order to control access thereto. The feeder has a generally trough-like arrangement with edges which are integrally formed therewith and which include slots therein for receiving adjustment rods which can be selectively moved or removed in order to control the accessability to the material contained or stored within the trough-like structure. The rods are moved or removed in accordance with the size of the head of a foal to selectively permit access thereto.

6 Claims, 7 Drawing Figures

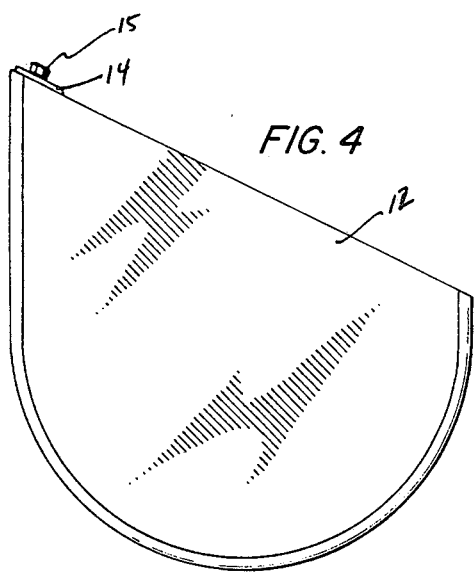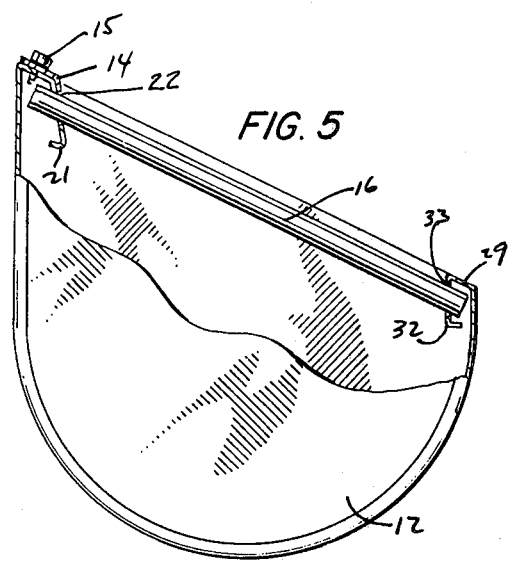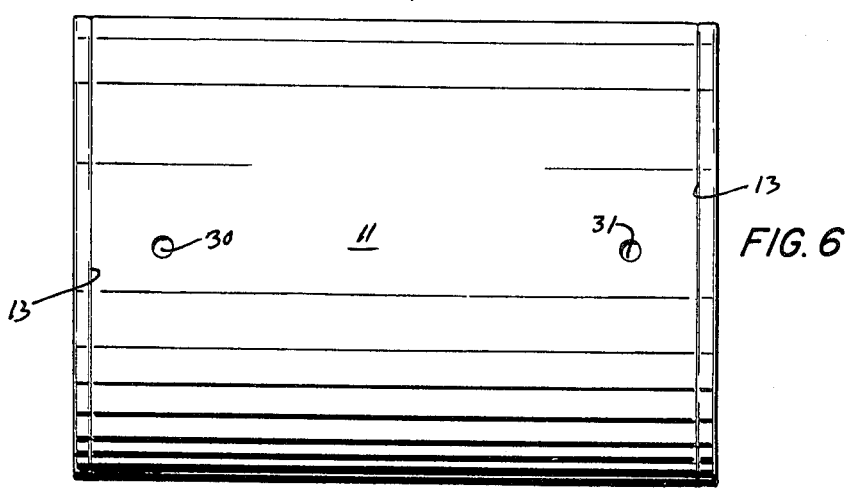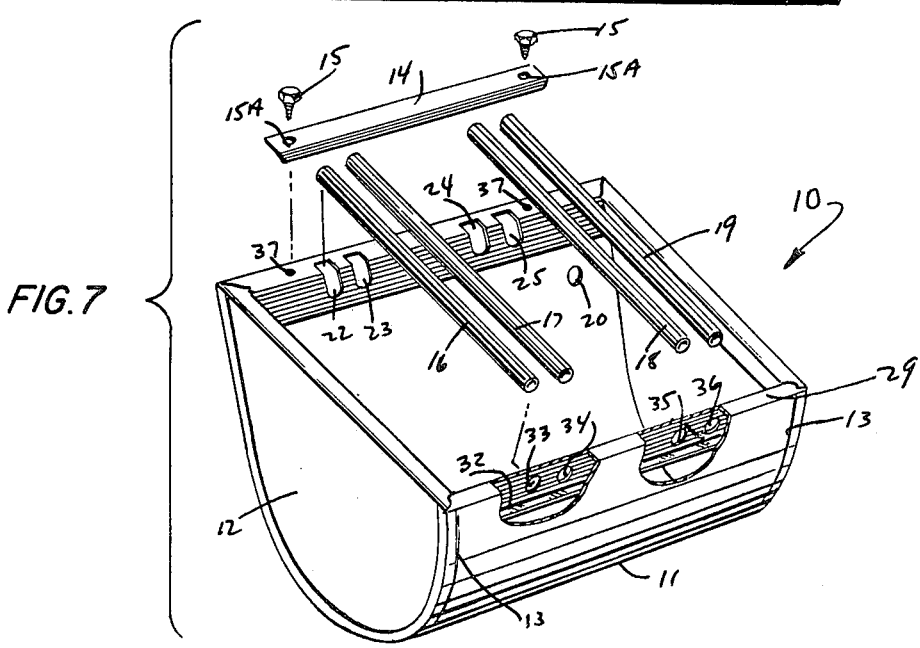

ADJUSTABLE FOAL FEEDER

BACKGROUND OF THE INVENTION

1. Field of the Invention

This invention is directed to a foal feeding apparatus, in general, and to an adjustable apparatus, in particular, to permit controlled access to the apparatus by the foal.

2. Prior Art

In the field of horse breeding and raising, it is noted that when a mare produces a foal, it is frequently desirable to provide the foal with a special mix of grain. Typically, the grain is constituted to assist the young foal in receiving all the necessary nutrients for good growth. However, it has been found that when the grain is placed in the stable area, the mare frequently eats the grain also. In the case of a greedy mare, the foal is frequently driven away from the feed and suffers as a result thereof. Inasmuch as it is desirable that the young horse or foal should be allowed all the grain it can readily consume, it is desirable to prevent the mare from having access to the grain while permitting the foal to have ready access thereto.

PRIOR ART

A patent search has not been conducted in this area. However, the best known prior art available to the applicant is a prior art version presently constructed and sold by applicant. An advertisement showing applicant's prior model is enclosed herewith. The new design and apparatus provides a number of advantages over the prior art model.

SUMMARY OF THE INVENTION

The invention comprises a trough-like member which has folded edges which are integrally formed with the trough. The folded edges include apertures therein for receiving adjustable or removable rods. A keeper or closing device is provided at one side of the trough to maintain the rods in the appropriate apertures.

BRIEF DESCRIPTION OF THE DRAWINGS

FIG. 4 is an end view of the apparatus.

FIG. 5 is a partially cut-away end view of the apparatus showing the interior configuration, especially of the folded edges.

FIG. 6 is a bottom view of the apparatus.

FIG. 7 is an exploded view of the apparatus of the instant invention.

DESCRIPTION OF THE PREFERRED EMBODIMENT

Figure 1:
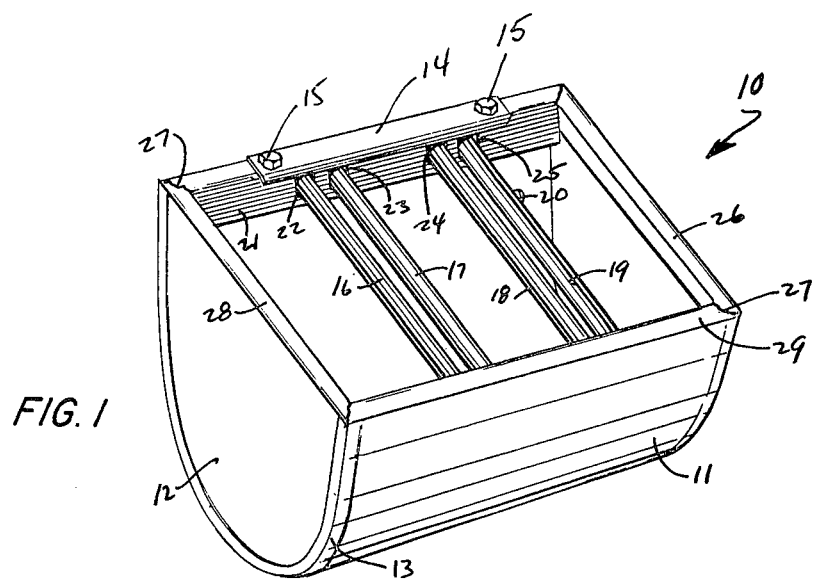
FIG. 1 is a perspective view of the feeder apparatus in accordance with the instant invention.

In the following description, similar components bear similar reference numerals.

Referring now to FIG. 1, there is shown a perspective view of the feeder apparatus of the instant invention. The feeder includes a trough-like member 11 which has an arcuate configuration (seen better in subsequent figures) and which has a higher back portion than front portion. A pair of side members 12 are joined to opposite ends of trough member 11 at seams 13. The seams 13 can be in the nature of welded seams, cold-rolled seams, or the like. Each of the sides 12 has a folded edge which includes at least two bends so that there are no sharp edges on the interior portion of the apparatus. The bends provide a U-shaped configuration for edge surface 26 and 28, respectively. Likewise, each end of the blank which forms trough member 11 is double bent to produce edges 21 and 29, respectively. As shown in FIG. 1, double bent edge 21 includes apertures 22, 23, 24 and 25 therein for receiving rods 16, 17, 18 and 19, respectively. The ends of the rods are inserted into the respective apertures and secured therein by means of keeper 14 which is mounted on edge 21 by means of suitable screws 15. To provide additional strength and to avoid exposed edges, sides 12 and trough 11 are welded at weld joints 27 at the four corners of the respective edges. As shown in FIG. 1, mounting holes such as hole 20 are provided in the back portion of trough 11.

Figure 2:
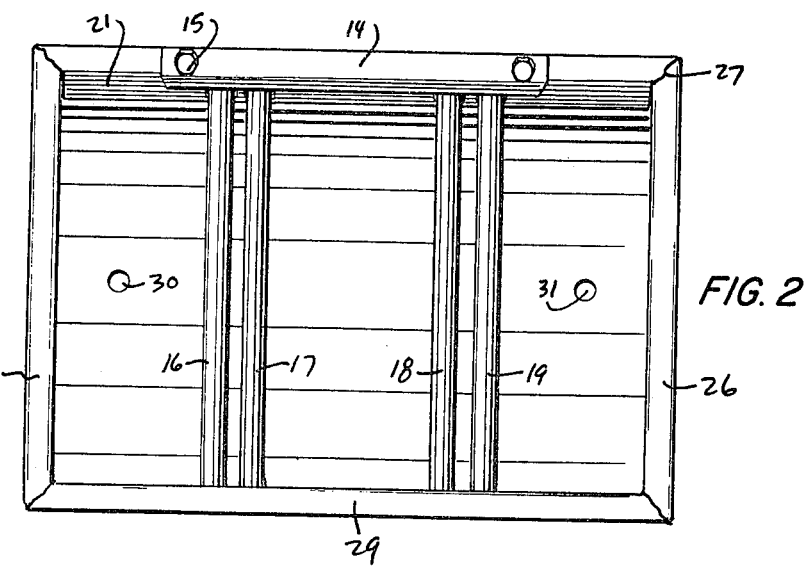
FIG. 2 is a top view of the apparatus.

Referring now to FIG. 2, there is shown a top view of the feeder apparatus 10. The respective edges 21, 26, 29 and 37 are shown thereon. The rods or shafts 16, 17, 18 and 19 are indicated in place and secured by keeper 14 and screws 15. In addition, drainage holes 30 and 31 are indicated in the bottom of trough 11.

Figure 3:
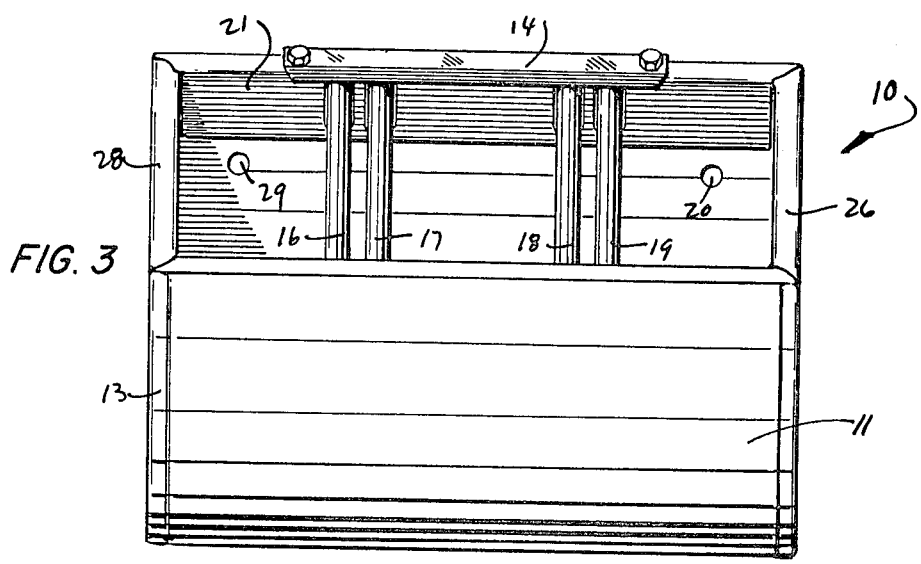
FIG. 3 is a front view of the apparatus.

Referring now to FIG. 3, there is shown a front view of feeder apparatus 10. In this view, the seams 13 are more readily discernible, as are mounting holes 20 and 59, respectively. FIG. 3 shows the relationship of the mounting holes to the shafts 16 through 19. Also, this Figure shows the relationship between the shafts and the respective apertures.

Referring concurrently to FIGS. 4 and 5, there is shown a full side view (FIG. 4) and a partially cut-away side view (FIG. 5) of side 12. FIGS. 4 and 5 both show the disposition of keeper 14 and screws 15 relative to the feeder apparatus. As shown in the cut-away portion of FIG. 5, shaft 16 is inserted into aperture 32 which is formed in the vertical portion of edge 29. In addition, the other end of shaft 16 is inserted into aperture 22 in edge member 21 and secured by keeper 14 and screw 15. It should be noted from FIG. 5, that aperture 33 in edge member 32 is formed only in the vertical portion thereof wherein the top section of edge 29 acts as a keeper for the lower end of shaft 16. Conversely, aperture 22 in edge 21 is formed in both the substantially vertical and substantially horizontal portions of this edge. Consequently, shaft 16 can be inserted into aperture 32 and then dropped into place in aperture 22. This arrangement permits for the ready removal (or insertion) of the respective shafts when keeper 14 and screws 15 are removed.

Referring to FIG. 6, there is shown a bottom view of feeder apparatus 10 which includes trough member 11 and sides 12 which are joined thereto at seams 13. The relationship of drainage holes 30 and 31 in the bottom of trough 11 are demonstrated.

Referring to FIG. 7, there is shown an exploded Figure of feeder apparatus 10. In this case, trough 11 and sides 12 are joined at seams 13 as described supra. View 7 best shows the arrangement of apertures 33, 34, 35 and 36 in the vertical portion 32 of the front edge 29. It is seen that these apertures, formed as circular openings in this embodiment, are adapted to receive shafts or rods 16 through 19, respectively. The ends of the respective shafts are inserted into the apertures and retained therein through the combined operation of the apertures in vertical edge portion 32 and the inner surface of trough 11. After the respective shafts are inserted into apertures 33–36, the other ends of the shafts are inserted into elongated slots 22, 23, 24 and 25. By having the slots extend through both the vertical and horizontal portions of edge 21, ready access to the ends of the shafts is permitted. After the shafts have been placed into the slots 22 through 25, keeper 14 is placed over edge 21 and secured thereto by means of screws 15 which are inserted into screw holes 37. For convenience, keeper 14 is shown having a bent-over forward edge which follows the contour of edge 21. Of course, a modification in this area can be provided.

In operation, the trough is assembled in accordance with typical assembly techniques. The trough is then mounted in place, by means of appropriate mounting apparatus used with mounting holes 20 and 29. For example, lag bolts or the like can be used to mount the trough to the wall of the stable or other location.

Thereafter, the trough is filled with the appropriate feed suitable for the foal and its age group. Thereafter, depending upon the size of the foal and the size of the mare, one or more of shafts 16 through 19 can be inserted into one or more of apertures 33 through 36 and the corresponding apertures 22 through 25 at the other side of the feeder apparatus. As described above, keeper 14 and screws 15 are then applied to maintain the shaft or rod in place.

The feeder permits the ready adjustment of the opening which is available to the foal and the mare. However, by appropriately selecting the positioning of the shaft or shafts, the opening can be restricted so that the head or nose of the mare will not fit between shafts or the shafts in the side. Consequently, the mare cannot partake of any of the feed which is located within the trough. On the other hand, the nose and head of the foal, which is much smaller, will readily enter the appropriate space between the shafts whereby the foal is enabled access to the contents of the trough. As the foal grows, the shaft or shafts can be rearranged and/or removed, thereby altering the size of the opening available to the foal. When the foal has reached the size equivalent to the size of the mare, all of the shafts or rods can be removed and the foal and the mare can then equally utilize the trough for feeding. At this time, however, the foal should be of sufficient size to compete with the mare for the eating rights.

In a typical example, the feeder apparatus is approximately 13 ¾ inches wide by 10 inches deep by 7 inches high. The spacer bars or shafts are on the order of ¼" diameter galvanized steel rod or shaft. A typical material for fabrication is 22 gage galvanized steel although other materials are considered feasible. Apertures 33 to 36 can be ½" diameter holes or half inch square openings. Apertures 22 through 25 can be rectangular apertures on the order of ½ inch by 1 inch. The apertures, in this embodiment, are spaced apart by about 1 inch, center-to-center.

Thus, there has been shown and described a preferred embodiment of an adjustable foal feeder apparatus. Suitable dimensions and materials have been suggested. However, the dimensions and the materials can be altered if so desired. Likewise, an apparatus with four shafts and appropriate apertures therein is shown. The number of shafts and/or the number of apertures for receiving the shafts can be altered as well. For example, it may only be necessary to have three shafts and a plurality of apertures into which the shafts can be arranged. Therefore, any modifications along this line are intended to be included within this description as well. The descriptions and details shown and described herein are intended to be illustrative only and are not intended to be limitative. Rather, the scope of the application is limited only by the claims appended hereto.

Having thus described a preferred embodiment of the invention, what is claimed is:

1. An adjustable animal feeder comprising,
trough means including front, back and end members,
said front and back members each having upper edges thereof which are folded at least twice on the respective members to form an inverted U-shaped lip around the perimeter of said trough means and extending inwardly thereof,
a plurality of apertures formed in the inner leg surface of said inverted U-shaped lip in said upper edges,
said apertures in one of said upper edges extending beyond the fold therein thereby to form slots which communicate with the closed end of the inverted U-shaped lip,
at least one spacer member adapted to be selectively placed in said apertures so as to extend between said front and back members, and
keeper means adapted to be fastened over at least one of said slots to retain said spacer member in said slot.

2. The feeder recited in claim 1, wherein:
said front and back members are joined at the bottom edges thereof.

3. The feeder recited in claim 1, wherein:
said spacer member comprises a rod member which can be disposed in said apertures to define access areas to said trough means.

4. The feeder recited in claim 1, wherein:
said trough means and said end portions are welded together to form a unitary body.

5. The feeder recited in claim 1, wherein:
said trough means includes drainage holes in the bottom thereof and mounting holes in one member thereof.

6. The feeder recited in claim 1, wherein:
said trough means has a back portion which is higher than the front portion.

* * * * *